United States Patent
Dalton

(10) Patent No.: US 9,633,206 B2
(45) Date of Patent: Apr. 25, 2017

(54) DEMONSTRATING INTEGRITY OF A COMPARTMENT OF A COMPARTMENTED OPERATING SYSTEM

(75) Inventor: Christopher I. Dalton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 4789 days.

(21) Appl. No.: 10/165,840

(22) Filed: Jun. 7, 2002

(65) Prior Publication Data

US 2002/0194493 A1    Dec. 19, 2002

(30) Foreign Application Priority Data

Jun. 19, 2001   (GB) .................................. 0114885.7

(51) Int. Cl.
*G06F 17/00* (2006.01)
*G06F 21/57* (2013.01)
*G06F 21/50* (2013.01)

(52) U.S. Cl.
CPC .............. *G06F 21/57* (2013.01); *G06F 21/50* (2013.01); *G06F 2211/009* (2013.01); *G06F 2221/2105* (2013.01)

(58) Field of Classification Search
USPC .................... 713/150, 164, 200, 201; 726/1; 705/50–79
See application file for complete search history.

(56) References Cited

U.S. PATENT DOCUMENTS

| | | | |
|---|---|---|---|
| 4,747,040 A | 5/1988 | Blanset et al. | 718/108 |
| 4,799,156 A | 1/1989 | Shavit et al. | 705/26 |
| 4,926,476 A * | 5/1990 | Covey | 713/164 |
| 4,962,533 A | 10/1990 | Krueger et al. | 711/163 |
| 4,984,272 A | 1/1991 | McIlroy et al. | 726/17 |
| 5,029,206 A | 7/1991 | Marino et al. | 713/164 |
| 5,032,979 A | 7/1991 | Hecht et al. | 364/200 |
| 5,038,281 A | 8/1991 | Peters | 364/200 |
| 5,136,711 A | 8/1992 | Hugard et al. | 713/2 |
| 5,144,660 A | 9/1992 | Rose | 380/4 |

(Continued)

FOREIGN PATENT DOCUMENTS

| | | |
|---|---|---|
| CA | 2 187 855 A | 6/1997 |
| EP | 0 3040 33 A | 2/1989 |

(Continued)

OTHER PUBLICATIONS

U.S. Appl. No. 09/979,902, filed Nov. 27, 2001, Proudler, et al.

(Continued)

*Primary Examiner* — John Hayes
*Assistant Examiner* — John M Winter
(74) *Attorney, Agent, or Firm* — HP Patent Department

(57) ABSTRACT

A computing platform 20 runs a compartmented operating system 22 and includes a trusted device 23 for forming an integrity metric which a user can interrogate to confirm integrity of the operating system. Also, the integrity of an individual compartment 24 is verified by examining status information for that compartment including, for example, the identity of any open network connections, the identity of any running processes, and the status of a section of file space allocated to that compartment 24. Hence, the integrity of an individual compartment 24 of the compartmented operating system 22 can be demonstrated.

18 Claims, 2 Drawing Sheets

(56) References Cited

U.S. PATENT DOCUMENTS

| | | | | |
|---|---|---|---|---|
| 5,210,795 A * | 5/1993 | Lipner et al. ............... 713/187 |
| 5,261,104 A | 11/1993 | Bertram et al. ................ 713/1 |
| 5,278,973 A | 1/1994 | O'Brien et al. ............. 717/168 |
| 5,325,529 A | 6/1994 | Brown et al. ................ 709/222 |
| 5,359,659 A | 10/1994 | Rosenthal ........................ 380/4 |
| 5,361,359 A | 11/1994 | Tajalli et al. ................ 395/700 |
| 5,379,342 A * | 1/1995 | Arnold et al. .................... 380/2 |
| 5,404,532 A | 4/1995 | Allen et al. .................. 395/700 |
| 5,410,707 A | 4/1995 | Bell ................................ 713/2 |
| 5,414,860 A | 5/1995 | Canova et al. ............... 713/340 |
| 5,421,006 A * | 5/1995 | Jablon et al. ................... 714/36 |
| 5,440,723 A | 8/1995 | Arnold et al. ................ 395/181 |
| 5,444,850 A | 8/1995 | Chang ...................... 395/200.1 |
| 5,448,045 A | 9/1995 | Clark ............................. 235/382 |
| 5,454,110 A | 9/1995 | Kannan et al. ................... 713/2 |
| 5,473,692 A | 12/1995 | Davis ............................. 380/25 |
| 5,483,649 A | 1/1996 | Kuznetsov et al. ............ 726/22 |
| 5,495,569 A | 2/1996 | Kotzur ............................. 714/2 |
| 5,497,490 A | 3/1996 | Harada et al. ................ 713/100 |
| 5,497,494 A | 3/1996 | Combs et al. ................ 713/323 |
| 5,504,814 A * | 4/1996 | Miyahara ...................... 713/164 |
| 5,504,910 A | 4/1996 | Wisor et al. .................. 713/322 |
| 5,530,758 A | 6/1996 | Marino et al. ................ 713/150 |
| 5,535,411 A | 7/1996 | Speed et al. ..................... 713/2 |
| 5,537,540 A * | 7/1996 | Miller et al. ............... 714/38.13 |
| 5,548,763 A | 8/1996 | Combs et al. ................ 713/323 |
| 5,555,373 A | 9/1996 | Dayan et al. ................... 726/34 |
| 5,572,590 A | 11/1996 | Chess ............................... 380/4 |
| 5,619,571 A | 4/1997 | Sandstrom et al. .............. 380/4 |
| 5,657,390 A * | 8/1997 | Elgamal et al. .............. 713/151 |
| 5,680,452 A | 10/1997 | Shanton ....................... 713/167 |
| 5,680,547 A | 10/1997 | Chang ...................... 395/200.01 |
| 5,692,124 A | 11/1997 | Holden et al. ................... 726/2 |
| 5,694,590 A | 12/1997 | Thuraisingham et al. ... 395/600 |
| 5,771,354 A | 6/1998 | Crawford ...................... 709/229 |
| 5,787,175 A | 7/1998 | Carter ............................ 713/165 |
| 5,796,841 A * | 8/1998 | Cordery et al. ................ 380/55 |
| 5,809,145 A | 9/1998 | Slik ................................ 380/25 |
| 5,812,669 A * | 9/1998 | Jenkins et al. ................ 713/161 |
| 5,815,665 A | 9/1998 | Teper et al. .............. 395/200.59 |
| 5,825,890 A * | 10/1998 | Elgamal et al. .............. 713/151 |
| 5,828,751 A * | 10/1998 | Walker et al. ................ 713/175 |
| 5,841,869 A * | 11/1998 | Merkling et al. ............. 713/164 |
| 5,844,986 A | 12/1998 | Davis ............................... 380/4 |
| 5,845,068 A | 12/1998 | Winiger .......................... 726/3 |
| 5,864,683 A | 1/1999 | Boebert et al. ............... 709/249 |
| 5,867,646 A | 2/1999 | Benson et al. ................ 395/186 |
| 5,883,956 A * | 3/1999 | Le et al. ....................... 713/170 |
| 5,887,163 A | 3/1999 | Nguyen et al. ................... 713/2 |
| 5,889,989 A | 3/1999 | Robertazzi et al. .......... 718/105 |
| 5,892,900 A * | 4/1999 | Ginter et al. ................... 726/26 |
| 5,903,732 A | 5/1999 | Reed et al. .............. 395/200.59 |
| 5,913,024 A * | 6/1999 | Green et al. ...................... 726/3 |
| 5,915,019 A * | 6/1999 | Ginter et al. ................... 705/54 |
| 5,915,021 A * | 6/1999 | Herlin et al. ................... 705/67 |
| 5,917,360 A | 6/1999 | Yasutake ....................... 327/387 |
| 5,917,912 A * | 6/1999 | Ginter et al. ................. 713/187 |
| 5,922,074 A | 7/1999 | Richard et al. ................. 726/21 |
| 5,923,756 A * | 7/1999 | Shambroom .................. 713/156 |
| 5,923,763 A * | 7/1999 | Walker et al. .................. 380/51 |
| 5,933,498 A | 8/1999 | Schneck et al. .............. 705/504 |
| 5,949,876 A * | 9/1999 | Ginter et al. ................... 705/80 |
| 5,960,177 A | 9/1999 | Tanno ...................... 395/200.59 |
| 5,968,136 A * | 10/1999 | Saulpaugh et al. .............. 710/3 |
| 5,982,891 A * | 11/1999 | Ginter et al. ................... 705/54 |
| 5,987,605 A | 11/1999 | Hill et al. ......................... 713/2 |
| 5,987,608 A | 11/1999 | Roskind ........................ 713/200 |
| 5,991,414 A * | 11/1999 | Garay et al. .................. 713/165 |
| 5,996,076 A * | 11/1999 | Rowney et al. ............... 713/156 |
| 6,003,084 A * | 12/1999 | Green et al. .................. 709/227 |
| 6,006,332 A | 12/1999 | Rabne et al. ................. 713/201 |
| 6,012,080 A | 1/2000 | Ozden et al. ................. 718/102 |
| 6,023,689 A * | 2/2000 | Herlin et al. ................... 705/67 |
| 6,023,765 A | 2/2000 | Kuhn ............................. 726/4 |
| 6,049,878 A * | 4/2000 | Caronni et al. ................... 726/3 |
| 6,067,559 A | 5/2000 | Allard et al. ................. 709/202 |
| 6,078,948 A | 6/2000 | Podgorny et al. ............ 709/204 |
| 6,079,016 A | 6/2000 | Park ................................. 713/2 |
| 6,081,830 A | 6/2000 | Schindler ...................... 709/204 |
| 6,081,894 A | 6/2000 | Mann ............................ 713/188 |
| 6,081,900 A * | 6/2000 | Subramaniam et al. ........ 726/19 |
| 6,092,202 A * | 7/2000 | Veil et al. ....................... 726/27 |
| 6,100,738 A | 8/2000 | Illegems |
| 6,105,131 A * | 8/2000 | Carroll .......................... 713/155 |
| 6,115,819 A * | 9/2000 | Anderson ....................... 726/20 |
| 6,125,114 A | 9/2000 | Blanc et al. ................... 370/389 |
| 6,134,328 A * | 10/2000 | Cordery et al. ................ 380/55 |
| 6,138,239 A * | 10/2000 | Veil ................................. 726/10 |
| 6,154,838 A | 11/2000 | Le et al. .......................... 713/2 |
| 6,157,719 A | 12/2000 | Wasilewski et al. ......... 380/210 |
| 6,157,721 A * | 12/2000 | Shear et al. ................... 380/255 |
| 6,175,917 B1 | 1/2001 | Arrow et al. .................... 713/1 |
| 6,185,678 B1 * | 2/2001 | Arbaugh et al. ................. 713/2 |
| 6,185,683 B1 * | 2/2001 | Ginter et al. ................. 713/176 |
| 6,189,103 B1 * | 2/2001 | Nevarez et al. .................. 726/5 |
| 6,192,472 B1 * | 2/2001 | Garay et al. .................. 713/165 |
| 6,195,751 B1 * | 2/2001 | Caronni et al. ............... 713/163 |
| 6,198,824 B1 * | 3/2001 | Shambroom ................. 380/279 |
| 6,211,583 B1 | 4/2001 | Humphreys |
| 6,237,786 B1 * | 5/2001 | Ginter et al. ................. 213/153 |
| 6,253,193 B1 * | 6/2001 | Ginter et al. .................... 705/57 |
| 6,263,438 B1 * | 7/2001 | Walker et al. ................ 713/178 |
| 6,272,631 B1 | 8/2001 | Thomlinson et al. ......... 713/155 |
| 6,275,848 B1 | 8/2001 | Arnold .......................... 709/206 |
| 6,282,648 B1 * | 8/2001 | Walker et al. ................ 713/156 |
| 6,289,453 B1 * | 9/2001 | Walker et al. ................ 713/175 |
| 6,289,462 B1 * | 9/2001 | McNabb et al. ................ 726/21 |
| 6,292,569 B1 * | 9/2001 | Shear et al. ................... 380/255 |
| 6,292,900 B1 | 9/2001 | Ngo et al. ..................... 713/200 |
| 6,304,970 B1 | 10/2001 | Bizzaro et al. ................... 726/2 |
| 6,314,409 B2 * | 11/2001 | Schneck et al. ................ 705/54 |
| 6,314,519 B1 * | 11/2001 | Davis et al. ...................... 726/4 |
| 6,327,579 B1 | 12/2001 | Crawford ...................... 705/400 |
| 6,327,652 B1 | 12/2001 | England et al. .................. 713/2 |
| 6,330,669 B1 | 12/2001 | McKeeth ......................... 713/1 |
| 6,330,670 B1 | 12/2001 | England et al. .................. 713/2 |
| 6,367,012 B1 | 4/2002 | Atkinson et al. ............. 713/176 |
| 6,393,412 B1 | 5/2002 | Deep ............................. 705/400 |
| 6,446,203 B1 | 9/2002 | Aguilar et al. ................... 713/2 |
| 6,449,716 B1 | 9/2002 | Rickey ............................. 713/2 |
| 6,477,702 B1 | 11/2002 | Yellin et al. .................. 717/126 |
| 6,487,601 B1 | 11/2002 | Hubacher et al. ............ 709/229 |
| 6,496,847 B1 | 12/2002 | Bugnion et al. ................. 718/1 |
| 6,505,300 B2 | 1/2003 | Chan et al. ................... 713/164 |
| 6,513,156 B2 | 1/2003 | Bak et al. ..................... 717/151 |
| 6,519,623 B1 | 2/2003 | Mancisidor ................... 718/100 |
| 6,530,024 B1 | 3/2003 | Proctor ........................... 726/23 |
| 6,609,248 B1 | 8/2003 | Srivastava et al. ............ 717/147 |
| 6,622,018 B1 | 9/2003 | Erekson ........................ 455/420 |
| 6,671,716 B1 | 12/2003 | Diedrichsen et al. ......... 709/203 |
| 6,678,833 B1 * | 1/2004 | Grawrock ..................... 713/401 |
| 6,681,304 B1 | 1/2004 | Vogt et al. .................... 711/164 |
| 6,701,440 B1 | 3/2004 | Kim et al. ...................... 726/24 |
| 6,732,276 B1 | 5/2004 | Cofler et al. .................. 713/200 |
| 6,751,680 B2 | 6/2004 | Langerman et al. ............. 710/3 |
| 6,757,824 B1 | 6/2004 | England ........................ 713/156 |
| 6,757,830 B1 | 6/2004 | Tarbotton et al. ............ 713/188 |
| 6,775,779 B1 | 8/2004 | England et al. ............... 713/200 |
| 6,847,995 B1 * | 1/2005 | Hubbard et al. .............. 709/223 |
| 6,892,307 B1 | 5/2005 | Wood et al. ..................... 726/8 |
| 6,931,545 B1 * | 8/2005 | Ta et al. .......................... 726/10 |
| 6,948,069 B1 | 9/2005 | Teppler ......................... 713/178 |
| 6,965,816 B2 | 11/2005 | Walker .......................... 701/16 |
| 6,988,250 B1 | 1/2006 | Proudler et al. ................ 716/1 |
| 7,058,807 B2 * | 6/2006 | Grawrock et al. ............ 713/172 |
| 7,194,092 B1 * | 3/2007 | England et al. ............... 380/262 |
| 7,877,799 B2 * | 1/2011 | Proudler ......................... 726/21 |
| 8,037,380 B2 * | 10/2011 | Cagno et al. ................. 714/718 |
| 2001/0037450 A1 | 11/2001 | Metlitski et al. ............. 713/152 |
| 2002/0012432 A1 | 1/2002 | England et al. ............... 380/231 |
| 2002/0023212 A1 | 2/2002 | Proudler ....................... 713/164 |
| 2002/0042874 A1 | 4/2002 | Arora ............................ 712/229 |
| 2002/0059286 A1 * | 5/2002 | Challener ..................... 707/100 |
| 2002/0069354 A1 | 6/2002 | Fallon et al. ..................... 713/2 |

(56) References Cited

U.S. PATENT DOCUMENTS

| | | | |
|---|---|---|---|
| 2002/0120575 A1 | 8/2002 | Pearson et al. | 705/51 |
| 2002/0144104 A1* | 10/2002 | Springfield et al. | 713/2 |
| 2002/0180778 A1* | 12/2002 | Proudler | 345/734 |
| 2002/0184486 A1 | 12/2002 | Kershenbaum et al. | 713/150 |
| 2002/0184520 A1 | 12/2002 | Bush et al. | 713/200 |
| 2002/0188763 A1* | 12/2002 | Griffin | 709/310 |
| 2002/0194482 A1* | 12/2002 | Griffin et al. | 713/176 |
| 2002/0194496 A1* | 12/2002 | Griffin et al. | 713/200 |
| 2003/0009685 A1 | 1/2003 | Choo et al. | 713/200 |
| 2003/0014372 A1* | 1/2003 | Wheeler et al. | 705/71 |
| 2003/0014466 A1 | 1/2003 | Berger et al. | 709/102 |
| 2003/0023872 A1* | 1/2003 | Chen et al. | 713/200 |
| 2003/0037233 A1* | 2/2003 | Pearson | 713/156 |
| 2003/0037246 A1* | 2/2003 | Goodman et al. | 713/191 |
| 2003/0074548 A1* | 4/2003 | Cromer et al. | 713/1 |
| 2003/0084285 A1* | 5/2003 | Cromer et al. | 713/164 |
| 2003/0084436 A1 | 5/2003 | Berger et al. | 717/174 |
| 2003/0145235 A1 | 7/2003 | Choo | 713/201 |
| 2003/0191957 A1 | 10/2003 | Hypponen et al. | 713/200 |
| 2003/0196083 A1 | 10/2003 | Grawrock et al. | 713/156 |
| 2003/0196110 A1 | 10/2003 | Lampson et al. | 713/200 |
| 2003/0226031 A1* | 12/2003 | Proudler et al. | 713/200 |
| 2003/0226040 A1* | 12/2003 | Challener et al. | 713/202 |
| 2004/0003288 A1* | 1/2004 | Wiseman et al. | 713/201 |
| 2004/0039924 A1* | 2/2004 | Baldwin et al. | 713/189 |
| 2004/0045019 A1 | 3/2004 | Bracha et al. | 719/332 |
| 2004/0073617 A1 | 4/2004 | Milliken et al. | 709/206 |
| 2004/0073806 A1* | 4/2004 | Zimmer | 713/189 |
| 2004/0083366 A1* | 4/2004 | Nachenberg et al. | 713/170 |
| 2004/0148514 A1 | 7/2004 | Fee et al. | 713/200 |
| 2005/0256799 A1 | 11/2005 | Warsaw et al. | 705/37 |

FOREIGN PATENT DOCUMENTS

| | | |
|---|---|---|
| EP | 0 421 409 A2 | 4/1991 |
| EP | 0 510 244 A1 | 10/1992 |
| EP | 0 580 350 A1 | 1/1994 |
| EP | 0 825 511 A | 2/1998 |
| EP | 0 849 657 A | 6/1998 |
| EP | 0 849 680 A2 | 6/1998 |
| EP | 0 465 016 | 12/1998 |
| EP | 0 893 751 A1 | 1/1999 |
| EP | 0 895 148 A | 2/1999 |
| EP | 0 926 605 A1 | 6/1999 |
| EP | 0 992 958 A2 | 4/2000 |
| EP | 1 030 237 A1 | 8/2000 |
| EP | 1 056 014 A | 8/2000 |
| EP | 1 049 036 A2 | 11/2000 |
| EP | 1 055 990 A1 | 11/2000 |
| EP | 1 056 010 A1 | 11/2000 |
| EP | 1 076 279 A1 | 2/2001 |
| EP | 1 107 137 A2 | 6/2001 |
| GB | 2 317 476 A | 3/1998 |
| GB | 2 336 918 A | 11/1999 |
| GB | 0020441.2 | 8/2000 |
| GB | 2 353 885 A1 | 3/2001 |
| GB | 2 361 153 A | 10/2001 |
| WO | 93/25024 A | 12/1993 |
| WO | 94/11967 A | 5/1994 |
| WO | 95/24696 A | 9/1995 |
| WO | 95/27249 A | 10/1995 |
| WO | 97/29416 | 8/1997 |
| WO | 98/15082 A | 4/1998 |
| WO | 98/36517 A | 8/1998 |
| WO | 98/26529 | 9/1998 |
| WO | 98/40809 A2 | 9/1998 |
| WO | 98/44402 | 10/1998 |
| WO | 98/45778 A | 10/1998 |
| WO | 00/19324 | 4/2000 |
| WO | 00/19324 A1 | 4/2000 |
| WO | 00/31644 | 6/2000 |
| WO | 00/48062 | 8/2000 |
| WO | 00/48063 | 8/2000 |
| WO | 00/52900 A1 | 9/2000 |
| WO | 00/54125 | 9/2000 |
| WO | 00/54125 A1 | 9/2000 |
| WO | 00/54126 | 9/2000 |
| WO | 00/58859 | 10/2000 |
| WO | 00/73880 | 12/2000 |
| WO | 00/73880 A1 | 12/2000 |
| WO | 00/73904 | 12/2000 |
| WO | 00/73904 A1 | 12/2000 |
| WO | 00/73913 | 12/2000 |
| WO | 00/73913 A1 | 12/2000 |
| WO | 01/09781 A2 | 2/2001 |
| WO | 01/13198 | 2/2001 |
| WO | 01/23980 | 4/2001 |
| WO | 01/27722 A1 | 4/2001 |
| WO | 01/65334 A2 | 9/2001 |
| WO | 01/65366 A1 | 9/2001 |

OTHER PUBLICATIONS

U.S. Appl. No. 09/979,903, filed Nov. 27, 2001, Proudler, et al.
U.S. Appl. No. 10/080,476, filed Feb. 22, 2002, Proudler, et al.
U.S. Appl. No. 10/080,477, filed Feb. 22, 2002, Brown, et al.
U.S. Appl. No. 10/080,478, filed Feb. 22, 2002, Pearson, et al.
U.S. Appl. No. 10/080,479, filed Feb. 22, 2002, Pearson, et al.
U.S. Appl. No. 10/165,840, filed Jun. 7, 2002, Dalton.
U.S. Appl. No. 10/194,831, filed Jul. 11, 2002, Chen, et al.
U.S. Appl. No. 10/240,138, filed Sep. 26, 2002, Choo.
Barkley, J., et al., "Managing Role/Permission Relationships Using Object Access Types," ACM, pp. 73-80, Jul. 1998, retrieved Jun. 25, 2005.
Bontchev, V., "Possible Virus Attacks Against Integrity Programs and How to Prevent Them," Virus Bulletin Conference, pp. 131-141 (Sep. 1992).
Grimm, R., et al., "Separating Access Control Policy, Enforcement, and Functionality in Extensible Systems," ACM pp. 36-70, Feb. 2001, retrieved Jun. 25, 2005.
Jaeger, T., et al., "Requirements of Role-Based Access Control for Collaborative Systems," ACM, pp. 53-64, Dec. 1996, retrieved Jun. 25, 2005.
Naor, M., et al., "Secure and Efficient Metering," Internet: <http://citeseer.nj.com/naor98secure.html> Sections 1-1.3 (1998).
P.C Magazine Online; The 1999 Utility Guide: Desktop Antivirus; Norton Antivirus 5.0 DeLux, Internet.
Radai, Y., "Checksumming Techniques for Anti-Viral Purposes," Virus Bulletin Conference, pp. 39-68 (Sep. 1991).
Schneck, P.B., "Persistent Access Control to Prevent Piracy of Digital Information," *Proceedings of the IEEE*, vol. 87, No. 7, pp. 1239-1250 (Jul. 1999).
"System for Detecting Undesired Alteration of Software," IBM Technical Bulletin, vol. 32, No. 11 pp. 48-50 (Apr. 1990).
The Trusted Computing Platform Alliance, "Building Foundation of Trust in the PC,", 9 pages, located at Internet address <www.trustedpc.org/home/home.html.> (Jan. 2000).
Zhang, N.X., et al., "Secure Code Distribution," pp. 76-79, 1997 IEEE, retrieved Jun. 25, 2005.
U.S. Appl. No. 09/728,827, filed Nov. 28, 2000, Proudler et al.
U.S. Appl. No. 09/920,554, filed Aug. 1, 2001, Proudler.
U.S. Appl. No. 10/075,444, filed Feb. 15, 2002, Brown et al.
U.S. Appl. No. 10/080,466, filed Feb. 22, 2002, Pearson et al.
U.S. Appl. No. 10/175,183, filed Jun. 18, 2002, Griffin et al.
U.S. Appl. No. 10/175,185, filed Jun. 18, 2002, Pearson et al.
U.S. Appl. No. 10/175,395, filed Jun. 18, 2002, Pearson et al.
U.S. Appl. No. 10/175,542, filed Jun. 18, 2002, Griffin et al.
U.S. Appl. No. 10/175,553, filed Jun. 18, 2002, Griffin et al.
U.S. Appl. No. 10/206,812, filed Jul. 26, 2002, Proudler.
U.S. Appl. No. 10/240,137, filed Sep. 26, 2002, Dalton et al.
U.S. Appl. No. 10/240,139, filed Sep. 26, 2002, Choo et al.
U.S. Appl. No. 10/303,690, filed Nov. 21, 2002, Proudler et al.
Burke, J.P., "Security Suite Gives Sniffer Programs Hay Fever," *HP Professional*, vol. 8, No. 9, 3 pages total (Sep. 1994).
Dalton, C.I. and J.F. Griffin, "Applying Military Grade Security to the Internet," *Proceedings JENCS- Computer Networks and ISDN Systems*, vol. 29, pp. 1799-1808(1999).

(56) References Cited

OTHER PUBLICATIONS

Ford, B., et al., "Microkernels Meet Recursive Virtual Machines", Operating Systems Review, ACM, vol. 30, No. Special Issue, pp. 137-151 (Dec. 21, 1996).

Goldberg, R.P., "Survey of Virtual Machine Research", Computer, IEEE Service Center, vol. 7, No. 6, pp. 34-45 (Jun. 1974).

Popek, G. J., "Formal Requirements for Virtualizable Third Generation Architectures", Communications of the Association for Computing Machinery, ACM, vol. 17, No. 7, pp. 412-421 (Jul. 1974).

EDS Timeline, The 1960's, at EDS.com.

Anderson, R., et al., "Tamper Resistance—a Cautionary Note," *ISENIX Association, Second USENIX Workshop on Electronic Commerce*, pp. 1-11 (Nov. 18-21, 1996).

Berger, J.L., et al., "Compartmented Mode Workstation: Prototype Highlights," *IEEE Transactions on Software Engineering*, vol. 16, No. 6 (Jun. 1990).

Chaum, D., "Security without Identification: Transaction Systems to Make Big Brother Obsolete," *Communications of the ACM*, vol. 28, No. 10, pp. 1030-1044 (Oct. 1985).

Choo, T.H., et al., "Trusted Linux: A Secure Platform for Hosting Compartmented Applications," *Enterprise Solutions*, pp. 1-14 (Nov./Dec. 2001).

Dalton, C., et al., "An operating system approach to securing e-services," *Communications of the ACM*, vol. 44, Issue 2 (Feb. 2001).

Dalton, C.I., et al., "Design of secure UNIX," Elsevier Information Security Report, (Feb. 1992).

Hallyn, S.E., et al., "Domain and Type Enforcement for Linux," <Internet: <http://www.usenix.org/publications/library/proceedings/als2000/full_papers/hallyn/hallyn_html/>. (Retrieved Apr. 24, 2002).

Loscocco, P., et al., "Integrating Flexible Support for Security Policies into the Linux Operating System," Internet: <www.nsa.gov/selinux> (Retrieved Apr. 24, 2002).

Milojicic, D., et al., "Process Migration," Internet <http://www.hpl.hp.com/techreports/1999/HPL-1999-21.html.> pp. 1-48 (Dec. 5, 1998).

Scheibe, M., "TCPA Security: Trust your Platform!" *Quarterly Focus PC Security*, pp. 44-47. Internet: <http://www.silicon-trust.com/pdf/secure_PDF/Seite_44-47.pdf>.

Senie, D., "Using the Sock_Packet mechanism in Linux to gain complete control of an Ethernet Interface," Internet: <http://www.senie.com/dan/technology/sock_packet.html>. (Retrieved Apr. 24, 2002).

Wiseman, S., et al., "The Trusted Path between Smite and the User," *Proceedings 1988 IEEE Symposium on and Privacy*, pp. 147-155 (Apr. 18-21, 1988).

"Yee, B., Using Secure Coprocessors," Doctoral thesis—Carnegie Mellon University, pp. 1-94 (May 1994).

*Boot Integrity Services Application Programming Interface*, Version 1.0, Intel Corporation, pp. 1-60 (Dec. 28, 1998).

"Building a Foundation of Trust in the PC," *Trusted Computing Platform Alliance*, pp. 1-7 (Jan. 2000).

"HP Virtualvault: Trusted Web-server Platform Product Brief," Internet: <http://www.hp.com/security/products/virtualvault/papers/brief_4.0/> pp. 1-6.

"Information technology—Security techniques—Entity authentication; Part 3: Mechanisms using digital signature techniques," *ISO/IEC* 9798-3, Second Edition, pp. 1-6 (1998).

"Information technology—Security techniques—Key management—Part 3: Mechanisms using asymmetric techniques," *ISO/IEC* 11770-3, pp. 1-34 (1999).

"NIST Announces Technical Correction to Secure Hash Standard," Internet: <http://www.nist.gov/public_affairs/releases/hashstan.htm> pp. 1-2 (Oct. 24, 2002).

"Norton AntiVirus 5.0 Delux," *PC Magazine Online; The 1999 Utility Guide: Desktop Antivirus*, pp. 1-2, Internet: <http://wwww.zdnet.com/pcmag/features/utilities99/deskav07.html> (Retrieved Nov. 30, 2001).

"Secure Computing with JAVA™: Now and the Future," <http://java.sun.com/marketing/collateral/security.html> pp. 1-29 (Apr. 2, 2002).

"Secure Execution Environments, Internet Safety through Type-Enforcing Firewalls," Internet: <thp://www.ghp.com/research/nailabs/secure-execution/internet-safety.asp> (Retrieved Apr. 24, 2002).

*Sophos Anti-Virus for Notes/Domino release Note* Version 2.0, pp. 1-2, Internet: <http://www.sophos.com/sophos/products/full/readmes/readnote.txt> (Retrieved Nov. 30, 2001).

*Trusted Computing Platform Alliance (TCPA), Main Specification*, Version 1.0, pp. 1-284 (2000).

*Trusted Computing Platform Alliance (TCPA), TCPA Design Philosophies and Concepts*, Version 1.0, Internet: <www.trustedpc.org> pp. 1-30 (Jan. 2001).

* cited by examiner

DEMONSTRATING INTEGRITY OF A COMPARTMENT OF A COMPARTMENTED OPERATING SYSTEM

CROSS REFERENCE TO RELATED APPLICATIONS

The subject matter of the present application may also be related to the following U.S. Patent Applications: "Operation of Trusted State in Computing Platform," Ser. No. 09/728,827, filed Nov. 28, 2000; "Performance of a Service on a Computing Platform," Ser. No. 09/920,554, filed Aug. 1, 2001; "Secure E-Mail Handling Using a Compartmented Operating System," Ser. No. 10/075,444, filed Feb. 15, 2002; "Electronic Communication," Ser. No. 10/080,466, filed Feb. 22, 2002; "Multiple Trusted Computing Environments with Verifiable Environment Entities," Ser. No. 10/175,183, filed Jun. 18, 2002; "Renting a Computing Environment on a Trusted Computing Platform," Ser. No. 10/175,185, filed Jun. 18, 2002; "Interaction with Electronic Services and Markets," Ser. No. 10/175,395, filed Jun. 18, 2002; "Multiple Trusted Computing Environments," Ser. No. 10/175,542, filed Jun. 18, 2002; "Performing Secure and Insecure Computing Operations in a Compartmented Operating System," Ser. No. 10/175,553, filed Jun. 18, 2002; "Privacy of Data on a Computer Platform," Ser. No. 10/206,812, filed Jul. 26, 2002; "Trusted Operating System," Ser. No. 10/240,137, filed Sep. 26, 2002; "Trusted Gateway System," Ser. No. 10/240,139, filed Sep. 26, 2002; and "Apparatus and Method for Creating a Trusted Environment," Ser. No. 10/303,690, filed Nov. 21, 2002.

FIELD OF THE INVENTION

The present invention relates in general to a method for demonstrating the integrity of a compartment of a compartmented operating system, and to a trusted device and computing platform for performing the same.

BACKGROUND OF THE INVENTION

Compartmented operating systems have been available for several years in a form designed for handling and processing classified (military) information, using a containment mechanism enforced by a kernel of the operating system with mandatory access controls to resources of the computing platform such as files, processes and network connections. The operating system attaches labels to the resources and enforces a policy which governs the allowed interaction between these resources based on their label values. Most compartmented operating systems apply a policy based on the Bell-LaPadula model discussed in the paper "Applying Military Grade Security to the Internet" by C I Dalton and J F Griffin published in Computer Networks and ISDN Systems 29 (1997) 1799-1808.

Whilst a compartmented operating system is secure offering a relatively high degree of containment, it is desired to provide a method for demonstrating the integrity of a compartment. In particular, it is desired to demonstrate that a compartment is in a trusted state and will operate in a predicted manner. As one example, it is desired to confirm that the compartment is free from subversion, either arising inadvertently or through an unauthorised attack.

SUMMARY OF THE INVENTION

An aim of the present invention is to provide a method for demonstrating the integrity of an operating system compartment. Another aim is to provide a computing platform allowing demonstration of the integrity of an operating system compartment.

According to a first aspect of the present invention there is provided a method for demonstrating integrity of an operating system compartment in a computing platform having a trusted device, comprising the steps of: (a) providing a host operating system; (b) confirming a status of the host operating system using the trusted device; (c) providing a compartment of the host operating system; and (d) confirming a status of the compartment.

The step (b) preferably comprises providing an integrity metric of the host operating system, which may be compared against an integrity metric in a previously formed certificate, to verify integrity of the host operating system. Preferably, the integrity metric is formed by the trusted device.

The step (d) preferably comprises providing status metric of the compartment, which may be compared against a status metric in a previously formed certificate, to verify integrity of the compartment. Here, the step (d) comprises comparing the current state of the compartment against an expected state. The status metric is formed by the host operating system, or preferably is formed by the trusted device.

Preferably, the step (d) comprises providing information about the current state of the compartment, including information about any one or more of (i) a section of file space allocated to the compartment; (ii) any processes allocated to the compartment; or (iii) any communication interfaces allocated to the compartment. Preferably, the step (d) comprises confirming that the compartment only has access to an expected section of file space. Preferably, the step (d) comprises confirming that the allocated section of file space is in an expected condition. Preferably, the step (d) comprises confirming that only an expected process or processes are allocated to the compartment. Preferably, the step (d) comprises confirming that only expected IPC channels are open. Preferably, the step (d) comprises confirming that only expected communication interfaces are allocated to the compartment.

Also according to this first aspect of the present invention there is provided a method for use in a computing platform having a trusted device, the method comprising the steps of: (a) providing a host operating system; (b) verifying a status of the host operating system by comparing an integrity metric formed by the trusted device against an integrity metric in a previously formed certificate; (c) providing a compartment of the host operating system; and (d) verifying a status of the compartment by comparing a status metric formed by the trusted device against a status metric in a previously formed certificate.

According to a second aspect of the present invention there is provided a computing platform, comprising: a host operating system; at least one compartment provided by the host operating system; a trusted device arranged to confirm a status of the host operating system; and a status unit arranged to confirm a status of the compartment.

Preferably, the trusted device forms an integrity metric of the host operating system. Preferably, the trusted device forms the integrity metric during boot of the host operating system. Optionally, the integrity metric is updated periodically while the host operating system is running.

Preferably, the status unit comprises at least one of the host operating system or the trusted device.

Preferably, the status unit provides a current status of the compartment to be compared against an expected status. The status unit ideally provides a status metric based on the current status. Preferably, the current status identifies any one or more of (i) a section of file space allocated to the compartment, (ii) any processes allocated to the compartment, (iii) any IPC channels open for any process allocated to the compartment, or (iv) any communication interfaces allocated to the compartment.

Preferably, the status unit confirms a condition of the section of file space allocated to the compartment. Preferably, the condition of the section of file space allocated to the compartment is used to determine whether the section of file space has been corrupted.

Also according to this second aspect of the present invention there is provided a computing platform, comprising: a host operating system; a compartment provided by the host operating system; and a trusted device arranged to obtain an integrity metric of the host operating system for comparison against an integrity metric in a previously formed certificate, and arranged to obtain a status metric of the compartment for comparison against a status metric in a previously formed certificate.

Further, according to a third aspect of the present invention there is provided a trusted device for use in a computing platform providing a host operating system having at least one compartment, the trusted device comprising: means arranged in use to obtain an integrity metric of the host operating system for comparison against an integrity metric in a previously formed certificate; and means arranged in use to obtain a status metric of the compartment for comparison against a status metric in a previously formed certificate.

BRIEF DESCRIPTION OF THE DRAWINGS

For a better understanding of the invention, and to show how embodiments of the same may be carried into effect, reference will now be made, by way of example, to the accompanying diagrammatic drawings in which.

DESCRIPTION OF PREFERRED EMBODIMENTS

Figure 1:
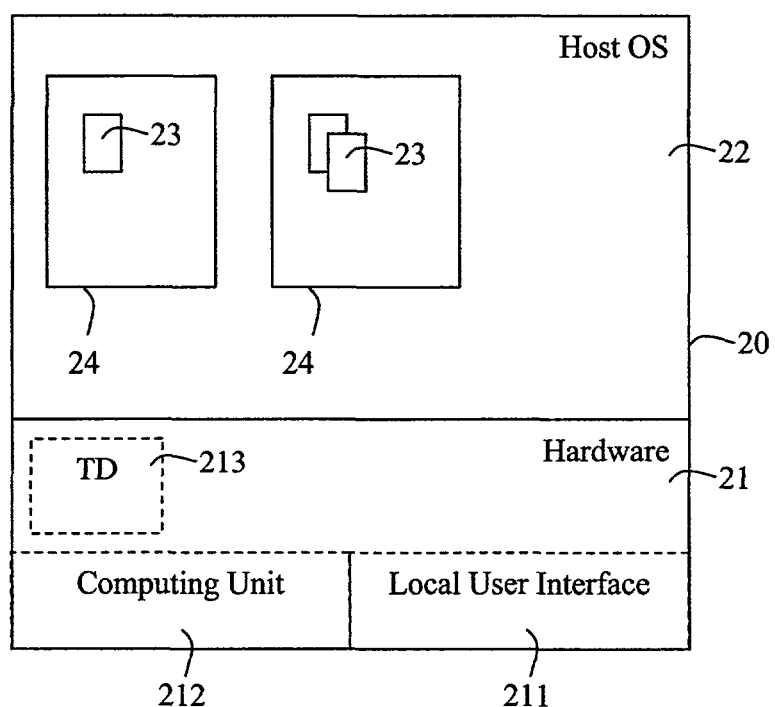
FIG. 1 shows an example computing platform.

FIG. 1 shows an example computing platform 20 employed in preferred embodiments of the present invention. The computing platform 20 comprises hardware 21 operating under the control of a host operating system 22. The hardware 21 may include standard features such as a keyboard, a mouse and a visual display unit which provide a physical user interface 211 to a local user of the computing platform. The hardware 21 also suitably comprises a computing unit 212 including a main processor, a main memory, an input/output device and a file storage device which together allow the performance of computing operations. Other parts of the computing platform are not shown, such as connections to a local or global network. This is merely one example form of computing platform and many other specific forms of hardware are applicable to the present invention.

In the preferred embodiment the hardware 21 includes a trusted device 213. The trusted device 213 is suitably a physical component such as an application specific integrated circuit (ASIC). Preferably the trusted device is mounted within a tamper-resistant housing. The trusted device 213 is coupled to the computing unit 212, and ideally to the local user interface unit 211. The trusted device 213 is preferably mounted on a motherboard of the computing unit 212. The trusted device 213 functions to bind the identity of the computing platform 20 to reliably measured data that provides an integrity metric of the platform.

Preferably, the trusted device 213 performs a secure boot process when the computing platform 20 is reset to ensure that the operating system 22 of the platform 20 is running properly and in a secure manner. During the secure boot process, the trusted device 213 acquires the integrity metric of the operating system 22 by examining operation of the computing unit 212 and the local user interface unit 211. The integrity metric is then available for a user to determine whether to trust the computing platform to operate is a predicted manner. In particular, a trusted computing platform is expected not to be subject to subversion such as by a virus or by unauthorised access.

WO 00/48063 (Hewlett-Packard) discloses an example computing platform suitable for use in preferred embodiments of the present invention. In this example the trusted device 213 acquires a hash of a BIOS memory of the computing unit 212 after reset. The trusted device 213 receives memory read signals from the main processor and returns instructions for the main processor to form the hash. The hash is stored in the trusted device 213, which then returns an instruction that calls the BIOS program and a boot procedure continues as normal.

Preferably, the trusted device 213 controls the local user interface 211 such that a local user can trust the display of data provided on a visual display unit. WO 00/73913 (Hewlett-Packard) discloses an example system for providing a trustworthy user interface by locating a driver for the visual display unit within the trusted device 213.

The hardware 21 may also comprise a trusted user interface for performing secure communication with a user device such as a smart card held by the user. The trusted user interface allows the user to perform trusted communications with the trusted device 213 in order to verify the integrity of the computing platform 20. The use of a smart card or other token for trusted local user interaction is described in more detail in WO 00/54125 (Hewlett-Packard) and WO 00/54126 (Hewlett-Packard).

The computing platform 20 provides a computing environment 24 which gives access to resources of the computing platform, such as processor time, memory area, and filespace. Preferably, a plurality of discrete computing environments 24 are provided. Each computing environment is logically distinct, but shares access to at least some of the resources of the computing platform with other computing environments.

Suitably, the computing environment 24 runs as a compartment. The actions or privileges within a compartment are constrained, particularly to restrict the ability of a process to execute methods and operations which have effect outside the compartment 24, such as methods that request network access or access to files outside of the compartment. Also, operation of the process within the compartment is performed with a high level of isolation from interference and prying by outside influences.

Preferably, the compartment is an operating system compartment controlled by a kernel of the host operating system 22. This is also referred to as a compartmented operating system or a trusted operating system.

The preferred embodiment of the present invention adopts a simple and convenient form of operating system compartment. Each resource of the computing platform which it is desired to protect is given a label indicating the compartment to which that resource belongs. Mandatory access controls are performed by the kernel of the host operating system to ensure that resources from one compartment cannot interfere with resources from another compartment. Access controls can follow relatively simple rules, such as requiring an exact match of the label. Examples of resources include data structures describing individual processes, shared memory segments, semaphores, message queues, sockets, network packets, network interfaces and routing table entries.

Communication between processes is controlled by IPC (Inter-Process Communication) channels. Communication between compartments is provided using narrow kernel level controlled interfaces to a transport mechanism such as TCP/UDP. Access to these communication interfaces is governed by rules specified on a compartment by compartment basis. At appropriate points in the kernel, access control checks are performed such as through the use of hooks to a dynamically loadable security module that consults a table of rules indicating which compartments are allowed to access the resources of another compartment. In the absence of a rule explicitly allowing a cross compartment access to take place, an access attempt is denied by the kernel. The rules enforce mandatory segmentation across individual compartments, except for those compartments that have been explicitly allowed to access another compartment's resources. Communication between a compartment and a network resource is provided in a similar manner. In the absence of an explicit rule, access between a compartment and a network resource is denied.

Suitably, each compartment is allocated an individual section of a file system of the computing platform. For example, the section is a chroot of the main file system. Processes running within a particular compartment only have access to that section of the file system. Advantageously, through kernel controls, a process is restricted to the predetermined section of file system and cannot escape. In particular, access to the root of the file system is denied.

Advantageously, a compartment provides a high level of containment, whilst reducing implementation costs and changes required in order to implement an existing application within the compartment.

Referring to FIG. 1, it is desired to run a process 23 in one of the computing environments 24. In practical embodiments, many processes run on the computing platform simultaneously. Some processes are grouped together to form an application or service.

Each computing environment is suitably an operating system compartment 24 that contains a section of file space, a group of one or more processes, and a set of allowed communication interfaces to other compartments and to network resources. It is desired to demonstrate the integrity of a compartment by confirming that the compartment is in an expected state. In one example the expected state requires that any one or more of the following are in a particular condition, namely (a) the compartment only has access to an expected section of file space, (b) that the predetermined section of file space is in an expected condition, e.g. has not been corrupted by a virus, (c) only the expected process or processes are running; (d) only expected IPC channels are open; and (e) only expected communication interfaces are available. Preferably, information about any one or more of these conditions or other suitable criteria is combined to form a status metric. Suitably, the status metric is individual to the compartment 24 and describes the current status of that compartment.

The status metric can include many elements. For example, data event logging is performed as described in WO 00/73880 (Hewlett-Packard) and applied specifically to the compartment 24. Also, a file digest is produced by applying a hash function to one or more data files stored in the section of file space allocated to the compartment, as described in WO 00/73904 (Hewlett-Packard).

Preferably, the status metric is formed by the trusted device 213. To achieve the status metric, the trusted device 213 communicates with other components of the computing platform 20 such as the computing unit 212.

Preferably, information about the compartment used to form the status metric is gathered in response to hooks (e.g. IOCTALS, SYSCALLS) into a kernel of the host operating system 22.

Figure 2:
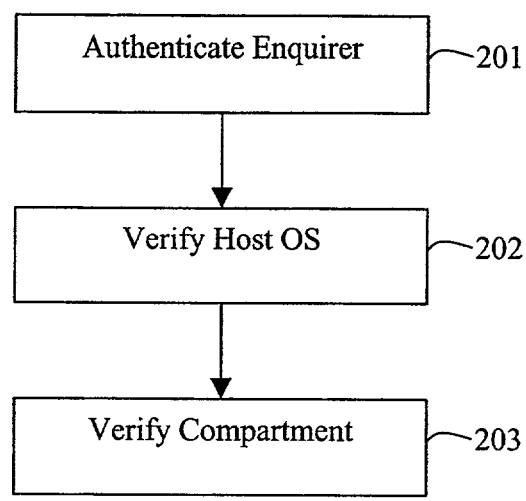
FIG. 2 shows a preferred method for demonstrating integrity of an operating system compartment.

FIG. 2 shows a preferred method for demonstrating the integrity of a compartment 24.

The method can be initiated by a local user of the computing platform 20, or a remote user coupled directly or indirectly to the computing platform 20.

Optionally, in step 201 authentication and authorisation checks are made to confirm that the party requesting demonstration of the integrity of a compartment is allowed access to that information.

In step 202 integrity of the computing platform is verified. Particularly, integrity of the host operating system 22 is verified. Preferably, the trusted device 213 provides an integrity metric of the host operating system 22.

In step 203, the status of a compartment 24 of the host operating system 22 is verified. Compartment status verification suitably includes providing access to information about the compartment or, preferably, providing a status metric containing the information in a specified form.

Preferably, the integrity metric of the host operating system and/or the status metric of the compartment are each compared against a certificate issued by a trusted party that is prepared to vouch for the integrity of the computing platform. A challenge and response may occur, such as the user sending a random number sequence to the computing platform and receiving the random number in return in an encoded format. If the verification is successful, the computing platform is considered a trusted computing platform. The user trusts the computing platform because the user trusts the trusted party. The trusted party trusts the computing platform because the trusted party has previously validated the identity and determined the proper integrity metric of the platform. More detailed background information concerning an example method for verifying the computing platform and the host operating system using an integrity metric is given in WO 00/48063 (Hewlett-Packard). A similar approach is adopted to verify the status metric of the compartment.

A method and computing platform have been described which allow demonstration of the integrity of a compartment of a compartmented operating system. Advantageously, a chain of trust is established firstly by verifying the host operating system, and then by verifying a particular compartment of the host operating system.

The invention claimed is:

1. A method for demonstrating integrity of an operating system compartment in a computing platform having a trusted device, comprising the steps of:
   (a) providing a host operating system of the computing platform;
   (b) determining a host operating system status of the host operating system using the trusted device;
   (c) providing a compartment of the host operating system; and
   (d) determining, by a processor, whether resources assigned to the compartment have been interfered with by resources from outside the compartment, the resources comprising at least a computer process assigned to the compartment; and (e) defining a compartment status based on the determining in step (d), wherein the step (d) comprises comparing a current state of the compartment against an expected state, providing information about the current state of the compartment, including information about at least one of (i) a section of file space allocated to the compartment, (ii) any processes allocated to the compartment, and (iii) any communication interfaces allocated to the compartment, and at least one of:

confirming that the compartment has access only to an expected section of file space;

confirming that the allocated section of file space is in an expected condition;

confirming that only an expected process or processes are allocated to the compartment; and confirming that only an expected communication interface or communication interfaces are allocated to the compartment.

2. The method of claim 1, comprising providing a status metric representing the current state of the compartment.

3. The method of claim 2, comprising providing the status metric from the trusted device of the computing platform.

4. The method of claim 1, comprising confirming for each process allocated to the compartment that only an expected Inter-Process Communication channel or channels are open.

5. The method of claim 1, wherein the trusted device is arranged to obtain an integrity metric of the host operating system for comparison against a previously formed certificate issued by a trusted party.

6. The method of claim 5 further including reporting to a user of the computing platform the results of the comparison made against the previously formed certificate issued by the trusted party.

7. The method of claim 1, wherein the step of providing the host operating system includes providing a motherboard, wherein said trusted device is an Application Specific Integrated Circuit (ASIC) and wherein the step of providing the host operating system further includes the step of mounting said ASIC on said motherboard.

8. The method of claim 1, wherein an analysis of the compartment is based upon an analysis of the host operating system.

9. A computing platform, comprising:

a host operating system;

at least one compartment provided by the host operating system;

a trusted device to determine a host operating system status of the host operating system; and a status unit to determine whether resources assigned to the compartment have been interfered with by resources from outside the compartment, the resources comprising at least a computer process assigned to the compartment, and define a compartment status based on the determination of whether the resources assigned to the compartment have been interfered with by resources from outside the compartment, wherein to determine whether the resources assigned to the compartment have been interfered with by resources from outside the compartment, the status unit is to:

compare a current state of the compartment against an expected state, provide information about the current state of the compartment, including information about at least one of (i) a section of file space allocated to the compartment, (ii) any processes allocated to the compartment, and (iii) any communication interfaces allocated to the compartment, and at least one of:

confirm that the compartment has access only to an expected section of file space, confirm that the allocated section of file space is in an expected condition, confirm that only an expected process or processes are allocated to the compartment, and confirm that only an expected communication interface or communication interfaces are allocated to the compartment.

10. The computing platform of claim 9, wherein the trusted device forms an integrity metric of the host operating system to be compared against an expected status.

11. The computing platform of claim 9, wherein the status unit comprises at least one of the host operating system or the trusted device.

12. The computing platform of claim 9, wherein the status unit provides a current status of the compartment to be compared against an expected status.

13. The computing platform of claim 12, wherein the status unit provides a status metric.

14. The computing platform of claim 12, wherein the current status identifies at least one of (i) a section of file space allocated to the compartment, (ii) any processes allocated to the compartment, (iii) any IPC channels open for any process allocated to the compartment, or (iv) any communication interfaces allocated to the compartment.

15. The computing platform of claim 14, wherein the status unit confirms a condition of the section of file space allocated to the compartment.

16. The computing platform of claim 15, wherein the condition of the section of file space allocated to the compartment is used to determine whether the section of file space has been corrupted.

17. The computing platform of claim 9, wherein the computing platform includes a motherboard and the trusted device comprises an Application Specific Integrated Circuit (ASIC) mounted on said motherboard.

18. The computing platform of claim 9, wherein an analysis of the compartment by the status unit is based upon an analysis of the host operating system by the trusted device.

* * * * *